H. P. M. BIRKINBINE.

Means for Operating Valves of City Water-Mains.

No. 7,964. Reissued Nov. 27, 1877.

Witnesses.

Harry Birkinbine

Stephen Ustick

Inventor

Henry M. Birkinbine

UNITED STATES PATENT OFFICE.

HENRY P. M. BIRKINBINE, OF PHILADELPHIA, PENNSYLVANIA.

IMPROVEMENT IN MEANS FOR OPERATING VALVES OF CITY WATER-MAINS.

Specification forming part of Letters Patent No. 134,348, dated December 31, 1872; Reissue No. 7,964, dated November 27, 1877; application filed January 5, 1877.

*To all whom it may concern:*

Be it known that I, HENRY P. M. BIRKINBINE, of the city and county of Philadelphia, in the State of Pennsylvania, have invented certain Improvements in Fire-Protection and Operating Valves of Hydraulic Mains, which improvements are fully set forth in the following specification, reference being had to the accompanying drawings.

My invention is applicable in cities or towns which are supplied with water that is caused to flow by its gravity from a reservoir, stand-pipe, or other receptacle into which it is forced by means of a pumping apparatus.

The invention consists in cutting off the flow of water in the pumping-main at any convenient point before it reaches the reservoir or other receptacle, and causing it to flow, by the force exerted by the pumping apparatus, through the distributing main or mains, and thence through the fire-hydrants and the necessary hose for extinguishing fires, without the use of the ordinary fire-engines.

I effect this object by connecting, at any convenient point, a distributing-main with the pumping-main, and insert valves in each main, so arranged as to have one opened and the other closed simultaneously by means of hydraulic or pneumatic apparatus or electricity, the apparatus being controlled from the pumping-station, police-station, or other desired point.

One of the modes by which I propose to operate the valves so as to transfer the force of the pumping apparatus to the distributing main or mains is illustrated in the accompanying drawings.

Figure 1:
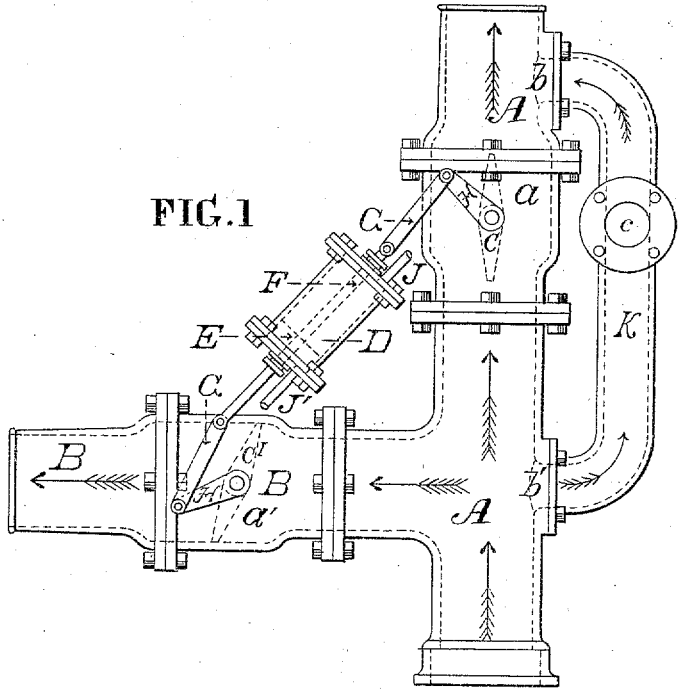
Figure 2:
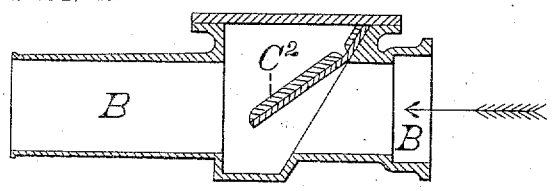

Figure 1 is a plan view of a pumping-main and distributing-main with the improvement attached. Fig. 2 is a vertical section of a distributing-main provided with a back-pressure valve, $C^2$.

A is the pumping-main, and B a distributing-main. C is a valve inserted in the pumping-main at the point *a*, and $C^1$ another valve, connected with the distributing-main at the point *a'*. D is a cylinder, which is provided with a piston, E. F is the piston-rod, at each end of which is jointed a connecting-rod, G, the outer ends of which connect with the crank-arms H H of the valves C and $C^1$. J J' are pipes, which connect with the ends of the cylinder D, and lead to the pumping-station, police-station, or any other point from which it is desired to operate the valves. The valves are opened and closed by forcing water or other fluid through the pipe J, when it is desired to close the valve C and open the valve $C^1$, so as to cut off the flow of water into the reservoir or other receptacle, and to use the force of the pumping apparatus to force the water through the distributing-main; and when the position of the valves is to be reversed, so as to open the flow of water to the reservoir through the pipe A, and cut off the flow of water through the distributing-pipe B, the water or other fluid is forced through the pipe J' into the cylinder D. Pneumatic power may be used with the same apparatus, instead of the hydraulic power, for opening and closing the valves; or they may be controlled by means of electrical power. When this power is used, the pipe J is connected with the pumping-main, having a valve in it which is opened by means of a weight or spring. This is held or kept closed by a keeper at the end of a lever, which is so arranged that when a current of electricity is passed through it, it disengages the lever, and allows the valve to open, when the pressure of water in the main, acting upon the piston in the cylinder D, reverses the valves C and $C^1$. A back-pressure valve must be placed in the main or mains leading from the reservoir, so that when the pressure in the distributing-mains becomes greater than that due to the head of the reservoir the valve will close and prevent the water flowing back.

Fig. 2 represents an ordinary form of back-pressure or check valve, so placed in the distributing main or mains that the flow of water from the basin, stand-pipe, or other receptacle will be as indicated by the arrow, and will keep the valve opened; but as soon as the current of water is changed by reason of a superior pressure being produced upon the other side of the valve, it will close and prevent the water being forced back into the reservoir, stand-pipe, or other receptacle.

K is a pipe, connected with the pumping-main A at the points *b* and *b'*, and provided with a safety-valve at any convenient point *c*.

The safety-valve is loaded to any desired pressure; and when the pressure through the pumping-main is in excess of this, the valve opens and allows the water to flow through the pipe into the pumping-main at *b*, and thence into the reservoir.

I do not confine myself to any particular form of valves, as any of the known valves for opening and closing pipes will answer the purpose; nor do I confine myself to the mechanical means shown for operating the valves.

I claim as my invention—

1. The combination of valves with the pumping-main and distributing-main, operated by suitable mechanism, substantially as described, so that one shall open simultaneously with the closing of the other, substantially in the manner and for the purpose set forth.

2. The combination of the cylinder D, its piston and connecting rods, and the valves C and C', with the pumping and distributing mains, substantially in the manner and for the purpose set forth.

3. The pipes J and J', in combination with the cylinder D, and leading therefrom to the pumping or other station, for the transmission of power by means of hydraulic or other pressure, for operating the piston E, substantially as set forth.

4. A back-pressure valve, in combination with a distributing or supply main or mains, so placed that when the connection between the pumping apparatus and reservoir or other receptacle is closed, the increase of pressure will cause the back-pressure valve to close, and, by preventing the water flowing into said reservoir, cause the augmented pressure to be exerted from the pumping apparatus directly upon the distributing main or mains, and when the extra pressure is removed the back-pressure-valve will open and allow the water to flow from the reservoir by its own gravity, substantially in the manner and for the purpose set forth.

5. The pipe K, provided with a safety-valve, in combination with the pumping-main, substantially as and for the purpose set forth.

6. The system of diverting the water which is being forced, by means of a pumping apparatus, into a reservoir, stand-pipe, or other receptacle, and directing it into the distributing-mains by means of valves operated by suitable mechanism, substantially as described, so as to get the force of said pumping apparatus into the distributing main or mains, and thus produce a pressure or force greater than that due to the head of the reservoir, for putting out fires, substantially as set forth.

HENRY P. M. BIRKINBINE.

Witnesses:

THOMAS J. BEWLEY.

STEPHEN USTICK.